No. 642,968. Patented Feb. 6, 1900.
R. W. ELLIOTT.
APPARATUS FOR RAISING LIQUIDS.
(Application filed Sept. 20, 1899.)
(No Model.)
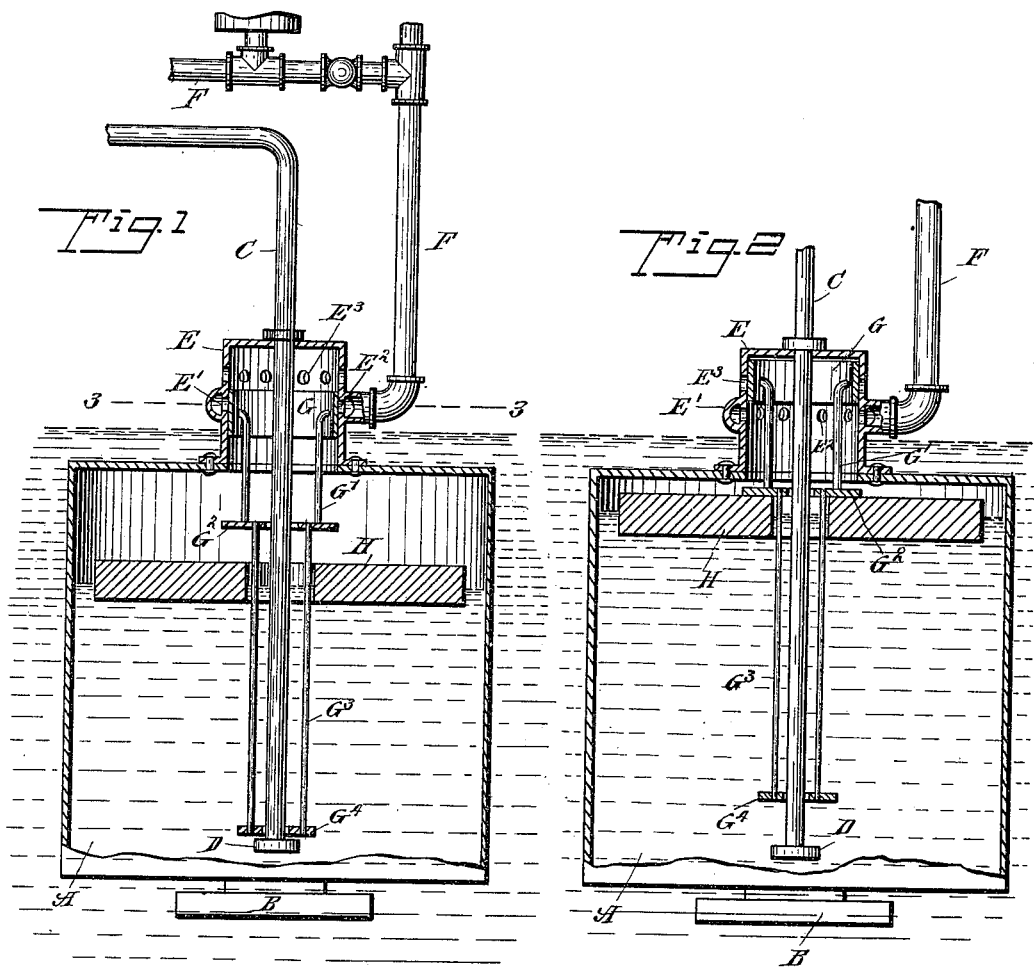
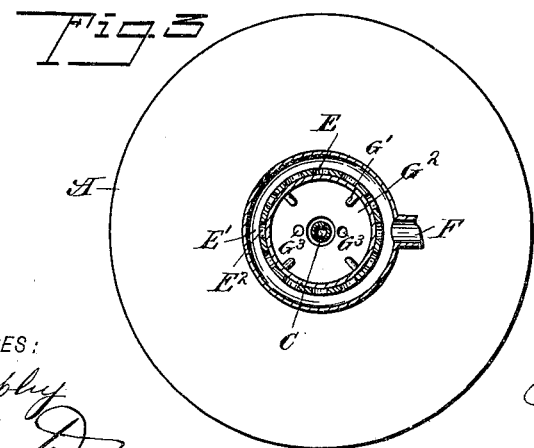
WITNESSES:
INVENTOR
Ralph W. Elliott
BY
ATTORNEYS

UNITED STATES PATENT OFFICE.

RALPH WALDO ELLIOTT, OF OAKLEY, CALIFORNIA.

APPARATUS FOR RAISING LIQUIDS.

SPECIFICATION forming part of Letters Patent No. 642,968, dated February 6, 1900.

Application filed September 20, 1899. Serial No. 731,092. (No model.)

*To all whom it may concern:*

Be it known that I, RALPH WALDO ELLIOTT, of Oakley, in the county of Contra Costa and State of California, have invented a new and Improved Apparatus for Raising Liquids, of which the following is a full, clear, and exact description.

The invention relates to apparatus for raising liquids, such as shown and described in the Letters Patent of the United States No. 597,273, granted to me on January 11, 1898.

The object of the present invention is to provide a new and improved apparatus for raising liquids which is simple and durable in construction and arranged to automatically control the motive agent used for forcing the liquid from a lower to a higher level.

The invention consists of novel features and parts and combinations of the same, as will be fully described hereinafter and then pointed out in the claim.

A practical embodiment of my invention is represented in the accompanying drawings, forming a part of this specification, in which similar characters of reference indicate corresponding parts in all the views.

Figure 1 is a sectional side elevation of the improvement. Fig. 2 is a like view of the same with parts in a different position, and Fig. 3 is a sectional plan view of the same on line 3 3 in Fig. 1.

The improved apparatus for raising liquids is provided with a vessel A, submerged in the liquid to be raised and provided at its bottom with a self opening and closing inlet-valve B for admitting liquid to the vessel A, as hereinafter more fully described. The liquid in the vessel A is discharged through a pipe C, carrying at its lower end a self opening and closing inlet-valve D, located near the bottom of the vessel A, the pipe C extending upwardly through a cylinder E, arranged on the top of the vessel A and forming part of the valve for controlling the motive agent, such as compressed air, passing through a pipe F from a motive-agent supply to the said cylinder by way of an annular chamber E', having ports or openings $E^2$, leading to the outside of the cylinder E. A second set of apertures or openings $E^3$ is arranged above the openings $E^2$, and said openings $E^3$ serve to connect the interior of the cylinder E and that of the vessel A with the atmosphere. A valve G, in the form of a ring, mounted to slide vertically in the cylinder E, is adapted to alternately open and close the sets of openings $E^2$ $E^3$, so that when the openings $E^2$ are closed, as shown in Fig. 1, the motive agent is cut off from the vessel A, while the interior thereof is connected with the atmosphere by the openings $E^3$. When the valve G is in an uppermost position, as shown in Fig. 2, the openings $E^3$ are closed and the openings $E^2$ are open, so that motive agent can pass into the vessel A to exert a pressure on the liquid therein, so as to force the liquid past the valve D into and through the pipe C to a suitable place of discharge.

The valve G is provided with rods G', carrying a collar $G^2$, from which depend rods $G^3$, carrying at their lower ends a collar $G^4$, and on the rods $G^3$ between the collars $G^2$ is mounted to rise and fall a float H, rising and falling with the liquid in the vessel A and serving to alternately engage the collars $G^2$ and $G^4$, so as to shift the valve G into the position shown in Figs. 2 and 1.

The operation is as follows: When the several parts are in the position shown in Fig. 1, then the motive agent in the pipe F is cut off from the interior of the vessel A by the valve G, and the liquid in which the vessel A is submerged will now flow into the vessel A by way of the valve B to fill said vessel A and to cause the float H to rise with the liquid rising in the said vessel A. As the float H moves into an uppermost position it comes in contact with the collar $G^2$ and finally lifts the same to shift the valve G into the uppermost position shown in Fig. 2, whereby the openings $E^3$ are closed and the openings $E^2$ are opened, so that the motive agent can pass into the vessel A and exert a pressure on the liquid therein to force the liquid up through the pipe C to a place of discharge. Now as the liquid passes out of the vessel A the float H sinks with the falling liquid and finally comes in contact with the collar $G^4$ and moves the same downward and with it the valve G, so that the openings $E^3$ are again opened. The openings $E^2$ are closed and the motive agent shut off. The motive agent under pressure in the vessel A can now pass through the openings $E^3$ to the atmosphere, and consequently the liquid surrounding the vessel A can again pass into the same by way of the valve B. The above-described operation is then repeated.

Having thus fully described my invention, I claim as new and desire to secure by Letters Patent—

An apparatus for raising liquids, comprising a vessel having an inlet for the liquid to be raised and provided at the top with an air-inlet and an air-outlet, an apertured valve arranged to alternately close the air-inlet and the air-outlet, a liquid-outlet pipe arranged centrally or axially with respect to said valve and passing therethrough, rods extending downwardly from the valve and provided with collars having guided movement on the liquid-outlet pipe, and a float movable on said rods between the collars.

RALPH WALDO ELLIOTT.

Witnesses:
F. P. BAKER,
W. P. MORGANS.